(12) United States Patent
Lin et al.

(10) Patent No.: US 10,211,746 B1
(45) Date of Patent: Feb. 19, 2019

(54) INTEGRATED TRANSFORMER

(71) Applicant: Jing-Yuan Lin, New Taipei (TW)

(72) Inventors: Jing-Yuan Lin, New Taipei (TW);
Yao-Ching Hsieh, Kaohsiung (TW);
Huang-Jen Chiu, New Taipei (TW);
Sih-Yi Lee, Taoyuan (TW)

(73) Assignee: Jing-Yuan Lin, New Taipei (TW)

( * ) Notice: Subject to any disclaimer, the term of this patent is extended or adjusted under 35 U.S.C. 154(b) by 0 days.

(21) Appl. No.: 15/867,055

(22) Filed: Jan. 10, 2018

(30) Foreign Application Priority Data

Dec. 4, 2017 (TW) .............................. 106142384 A

(51) Int. Cl.
*H02M 3/156* (2006.01)
*H02M 3/335* (2006.01)
*H02M 3/337* (2006.01)
*H01F 27/38* (2006.01)
*H01F 3/14* (2006.01)
*H01F 27/24* (2006.01)
*H02M 1/42* (2007.01)
*H02M 1/00* (2006.01)

(52) U.S. Cl.
CPC .......... *H02M 3/33576* (2013.01); *H01F 3/14* (2013.01); *H01F 27/24* (2013.01); *H01F 27/38* (2013.01); *H02M 1/4241* (2013.01); *H02M 3/156* (2013.01); *H02M 3/337* (2013.01); *H02M 2001/0058* (2013.01)

(58) Field of Classification Search
CPC ... H02M 3/33576; H02M 3/335; H02M 3/156

USPC .......................... 336/170, 173, 214–215, 212
See application file for complete search history.

(56) References Cited

U.S. PATENT DOCUMENTS

| 2007/0152795 A1* | 7/2007 | Zeng .................... H01F 27/2804 336/212 |
| 2008/0224809 A1* | 9/2008 | Zhang ....................... H01F 3/12 336/170 |
| 2015/0310981 A1 | 10/2015 | Yen et al. | |

FOREIGN PATENT DOCUMENTS

| TW | M523180 U | 6/2016 |
| TW | 201635318 A | 10/2016 |

* cited by examiner

*Primary Examiner* — Timothy J. Dole
*Assistant Examiner* — Ishrat F Jamali
(74) *Attorney, Agent, or Firm* — Li & Cai Intellectual Property (USA) Office

(57) ABSTRACT

Disclosed is an integrated transformer used in a resonant converter. The integrated transformer includes a primary side circuit, a secondary side circuit and an integrated core. A first voltage received by the primary side circuit is converted to a second voltage due to the electromagnetic induction, and the second voltage is outputted by the secondary side circuit. The primary side circuit is configured on the integrated core. The integrated core includes many iron rings, and the iron rings have a common side. The common side of the iron rings is a center column of the integrated core, and the other sides of the iron rings are rim columns of the integrated core. The coils of the primary side circuit are configured respectively to the rim columns of the integrated core, and the coils of the primary side circuit are connected in serial.

8 Claims, 3 Drawing Sheets

INTEGRATED TRANSFORMER

BACKGROUND OF THE INVENTION

1. Field of the Invention

The present disclosure relates to a transformer; in particular, to an integrated transformer used in a resonant converter.

2. Description of Related Art

Referring to FIG. 1, a schematic diagram of a conventional core of a transformer is shown. Usually, a transformer used in a resonant converter has a coil WP at the primary side of the core of the transformer and has a coil WS at the secondary side of the core of the transformer, to build a path to transmit power and to separate the voltage levels of the primary side and the secondary side of the core of the transformer. As known, to have the transformer used in a resonant converter, the magnetizing inductance of the transformer needs to be adjusted. The magnetizing inductance of the transformer can be adjusted by having air gaps, changing turn numbers of coils or using different types of core.

In addition, when the transformer is used in a resonant converter, to reduce the current stress at the secondary side of the resonant converter, multiple sets of transformers are used to transmit power and separate the voltage levels of the primary side and the secondary side of the core. However, power transmitted between the primary side and the secondary side of the transformers may not be equal due to the differences among the magnetizing inductances of the transformers. As a result, the current delivery at the secondary side will be uneven.

SUMMARY OF THE INVENTION

To make the current delivery at the secondary side more even, a integrated transformer is provided by the present disclosure. Without having air gaps, changing turn numbers of coils or using different types of core, the magnetizing inductance inside the integrated transformer can still be reduced without adding gap-insertion, therefore, the gap-loss in transformer can be reduced.

One integrated transformer provided by the present disclosure is used in a resonant converter, and includes a primary side circuit, a secondary side circuit and an integrated core. The primary side circuit and the secondary side circuit, both include a plurality of coils. A first voltage received by the primary side circuit is converted to a second voltage due to the electromagnetic induction, and the second voltage is outputted by the secondary side circuit. The primary side circuit is configured on the integrated core. The integrated core includes a plurality of iron rings, and the iron rings have a common side. The common side of the iron rings is a center column of the integrated core, and the other sides of the iron rings are rim columns of the integrated core. The coils of the primary side circuit are configured respectively to the rim columns of the integrated core, and the coils of the primary side circuit are connected in serial.

In one embodiment of the integrated transformer provided by the present disclosure, the secondary side circuit is configured outside the integrated core, and the coils of the secondary side circuit are connected in parallel. In addition, the coils of the primary side circuit are wrapped respectively around the rim columns of the integrated core according to the same direction.

In one embodiment of the integrated transformer provided by the present disclosure, after the primary side circuit receives the first voltage, the magnetic flux generated by one of the coils of the primary side circuit is split to the center column of the integrated core and to the other coils of the primary side circuit. Besides, the magnetic flux generated by each coil of the primary side circuit respectively flows through a corresponding rim column according to a first direction, and the magnetic flux generated by each coil of the primary side circuit flows through the center column and the other rim columns according to a second direction. It should be noted that, the second direction is opposite to the first direction, and the corresponding rim column is the rim column each coil is wrapped around.

In one embodiment of the integrated transformer provided by the present disclosure, the coils of the primary side circuit and the secondary side circuit are implemented by wirings configured on a plurality of PCBs.

Another integrated transformer provided by the present disclosure is used in a resonant converter and includes a primary side circuit, a secondary side circuit and an integrated core. The primary side circuit includes a coil, and the secondary side circuit includes a plurality of coils. A first voltage received by the primary side circuit is converted to a second voltage due to the electromagnetic induction, and the second voltage is outputted by the secondary side circuit. The primary side circuit and the secondary side circuit are configured on the integrated core. The integrated core includes a plurality of iron rings, and the iron rings have a common side. The common side of iron rings is a center column of the integrated core, and the other sides of the iron rings are rim columns of the integrated core. The coil of the primary side circuit is configured on the center column of the integrated core, and the coils of the secondary side circuit are configured respectively to the rim columns of the integrated core.

In one embodiment of the integrated transformer provided by the present disclosure, the turn numbers of the coils of the secondary side circuit are equal or unequal for converting the first voltage to the same second voltage or different second voltages.

In one embodiment of the integrated transformer provided by the present disclosure, the coils of the primary side circuit and the secondary side circuit are implemented by wirings configured on a plurality of PCBs.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

[One Embodiment of the Integrated Transformer]

The integrated transformer provided in this embodiment is used in a resonant converter. A resonant converter having the integrated transformer provided in this embodiment has better conversion efficiency, because the magnetic flux flowing through an core of the integrated transformer is less and the magnetizing inductance inside the integrated transformer can be reduced.

The integrated transformer provided by this embodiment includes a primary side circuit, a secondary side circuit and an integrated core. The primary side circuit and the secondary side circuit both include a plurality of coils. A first voltage received by the primary side circuit can be converted to a second voltage due to the electromagnetic induction, and the second voltage is outputted by the secondary side circuit.

Figure 1:
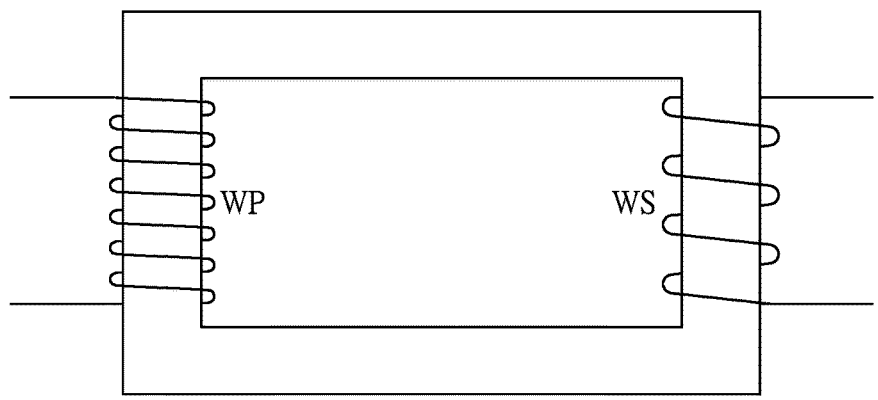
FIG. 1 shows a schematic diagram of a conventional core of a transformer.
Figure 2:
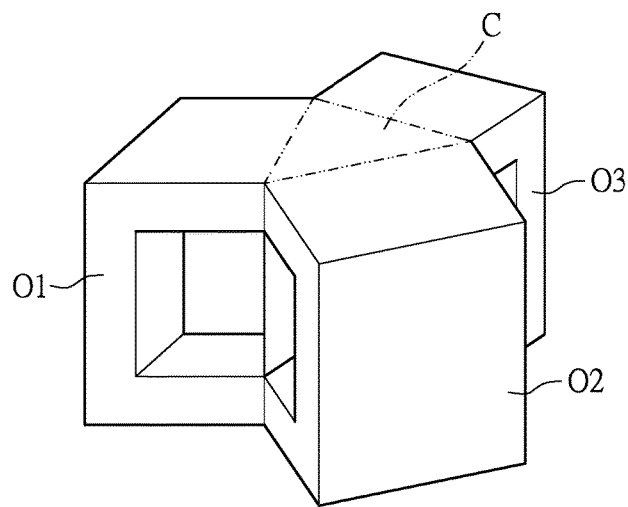
FIG. 2 shows a schematic diagram of an integrated core of an integrated transformer according to one embodiment of the present disclosure.

Referring to FIG. 2, a schematic diagram of an integrated core of an integrated transformer according to one embodiment of the present disclosure is shown. As shown in FIG. 2, the integrated core includes a plurality of iron rings, and these iron rings have a common side. The common side of the iron rings is a center column C of the integrated core, and the other sides of the iron rings are rim columns O1, O2 and O3 of the integrated core. The primary side circuit of the integrated transformer is configured on the integrated core. Specifically, the coils of the primary side circuit are configured respectively to the rim columns O1, O2 and O3 of the integrated core, and the coils of the primary side circuit are connected in serial. In addition, the secondary side circuit is configured outside the integrated core, and the coils of the secondary side circuit are connected in parallel.

It should be noted that, the coils of the primary side circuit are wrapped respectively around the rim columns O1, O2 and O3 of the integrated core according to the same direction. For example, the coils of the primary side circuit and the secondary side circuit are implemented by wirings configured on a plurality of PCBs (Printed Circuit Board; PCB). In this embodiment, the integrated core of the integrated transformer has three rim columns O1, O2 and O3, so the current generated by each coil can be split. As a result, the current stress can be reduced, and the resonant converter can have better conversion efficiency. Moreover, the integrated transformer is not designed according to a conventional wound primary type transformer bur according to a planar transformer, and thus the volume of the integrated transformer can be smaller.

Figure 3:
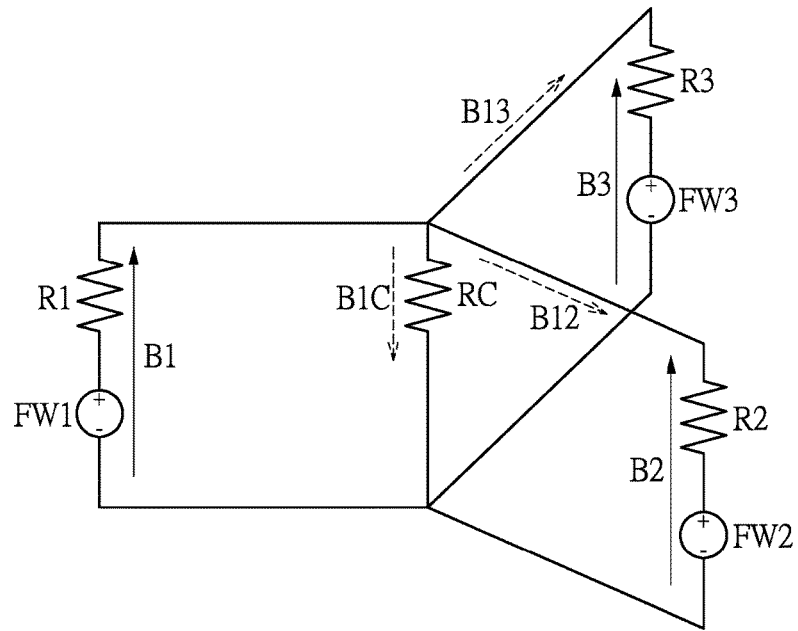
FIG. 3 shows a schematic diagram of the magnetomotive force and the magnetic flux generated at each rim column of the integrated core.

The integrated transformer provided by the present disclosure has a specific structure as described above, so after the primary side circuit receives the first voltage, the magnetic flux generated by each coil of the primary side circuit can be split and then flow to the center column C of the integrated core and the other coils of the primary side circuit. Referring to FIG. 3, a schematic diagram of the magnetomotive force and the magnetic flux generated at each rim column of the integrated core is shown.

FIG. 3 shows an equivalent circuit of the integrated transformer provided by this embodiment. After the primary side circuit receives the first voltage, each coil of the after the primary side circuit receives the first voltage generates a magnetomotive force FW1, FW2 and FW3. In FIG. 3, the resistors R1, R2 and R3 represent the magnetic resistances of the rim columns O1, O2 and O3 of the integrated core, respectively. The resistor RC represents the magnetic resistance of the center column of the integrated core. For the rim column O1 of the integrated core, the magnetic flux B1 generated by the coil wrapped around the rim column O1 flows to the center column and the other two rim columns O2 and O3.

In FIG. 3, the component of the magnetic flux B1 flowing to the rim column O2 is represented by B12, the component of the magnetic flux B1 flowing to the rim column O3 is represented by B13, and the component of the magnetic flux B1 flowing to the center column C is represented by B1C. Likewise, the components of the magnetic flux B2 flowing to the rim column O1, the rim column O3 and the center column C can be represented in the same way, and the components of the magnetic flux B3 flowing to the rim column O1, the rim column O2 and the center column C can also be represented in the same way. If the magnetic flux B1, B2 or B3 generated by each coil of the primary side circuit respectively flows through a corresponding rim column O1, O2 or O3 according to a first direction, and components of the magnetic flux B1, B2 or B3 generated by each coil of the primary side circuit flow through the center column C and the other rim columns O2 and O3, O1 and O3, or O1 and O2 according to a second direction, the second direction is opposite to the first direction. As shown in FIG. 3, the magnetic flux B1, B2 or B3 generated by each coil of the primary side circuit respectively flows upwards through a corresponding rim column O1, O2 or O3 (e.g. the direction of the magnetic flux B1), and the component of the magnetic flux B1, B2 or B3 generated by each coil of the primary side circuit flows downward through the center column C (e.g. the direction of the magnetic flux B1C).

In addition, there are components of the magnetic flux B1, B2 or B3 generated by each coil of the primary side circuit flowing through the other rim columns O2 and O3, O1 and O3, or O1 and O2. Thus, the magnetic flux B1 will be partially cancelled by the component of the magnetic flux B2 and the component of the magnetic flux B3 flowing through the rim column O1, the magnetic flux B2 will be partially cancelled by the component of the magnetic flux B1 and the component of the magnetic flux B3 flowing through the rim column O2, and the magnetic flux B3 will be partially cancelled by the component of the magnetic flux B1 and the component of the magnetic flux B2 flowing through the rim column O3. For example, if the magnetic flux B1 is 10 units, the component of the magnetic flux B1 flows downwards through the rim column O2 may be 2 units, the component of the magnetic flux B1 flows downwards through the rim column O3 may be 2 units, and the component of the magnetic flux B1 flows downwards through the center column C will be the left 6 units. Likewise, if the magnetic flux B2 is 10 units, the component of the magnetic flux B2 flows downwards through the rim column O1 may be 2 units, the component of the magnetic flux B2 flows downwards through the rim column O3 may be 2 units, and the component of the magnetic flux B2 flows downwards through the center column C will be the left 6 units. Also, if the magnetic flux B3 is 10 units, the component of the magnetic flux B3 flows downwards through the rim column O1 may be 2 units, the component of the magnetic flux B3 flows downwards through the rim column O2 may be 2 units, and the component of the magnetic flux B3 flows downwards through the center column C will be the left 6 units.

The magnetic flux B1, B2 or B3 will be partially cancelled by the components of the magnetic fluxes B2 and B3, B1 and B3 or B1 and B2 flowing through the rim column O1, O2 or O3, so in the above example, the magnetic flux B1, the magnetic flux B2 and the magnetic flux are all six units left (i.e. 10 units–2 units–2 units). As a result, the magnetic flux flowing through each rim column of the integrated core is decreased, which reduces the magnetizing inductance inside the integrated transformer and decreases the power loss of the integrated core.

The integrated core of the integrated transformer in this embodiment has a specific structure described above, so without having air gaps, changing turn numbers of coils or using different types of core, the magnetizing inductance inside the integrated transformer can still be reduced such that the integrated transformer can be used in a resonant converter.

It is worth mentioning that, in this embodiment, the shape and the structure of the integrated core is not restricted by FIG. 2. The shape and the structure of the integrated core shown in FIG. 2 are only for illustrating the specific structure of the integrated core of the integrated transformer in this embodiment. The shape and the structure of the integrated core of the integrated transformer in this embodiment can be adjusted according to actual needs as long as the equivalent circuit of the integrated core of the integrated transformer can be shown as the circuit structure in FIG. 3.

For example, in FIG. 2, the integrated core only has three iron rings. The common side of the iron rings is a center column C, and the other sides of the iron rings are rim columns O1, O2 and O3 of the integrated core. However, in this embodiment, the number of the iron rings of the integrated core is not limited. In other words, the integrated core can have more than three iron rings. The common side of the iron rings is a center column C, and the other sides of the iron rings are rim columns of the integrated core.

Figure 4:
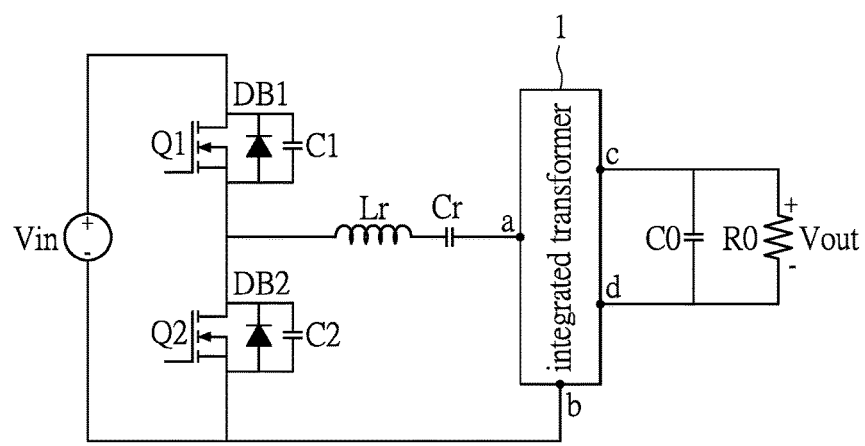
FIG. 4 is a schematic diagram showing how the integrated transformer according to one embodiment of the present disclosure is used in a resonant converter.

Referring to FIG. 4, a schematic diagram showing how the integrated transformer according to one embodiment of the present disclosure is used in a resonant converter is shown. FIG. 4 illustrates how the integrated transformer in this embodiment can be configured in a resonant converter. As shown in FIG. 4, an input voltage Vin, an upper-side switch Q1 and a lower-side switch Q2 of a resonant converter are configured at one side of the integrated transformer 1. The diode DB1 is the body diode of the upper-side switch Q1, and the diode DB2 is the body diode of the lower-side switch Q2. The capacitor C1 is the parasitic capacitor of the upper-side switch Q1, and the capacitor C2 is the parasitic capacitor of the lower-side switch Q2. In addition, the inductor Lr is the resonant inductor of the resonant converter, and the capacitor Cr is the resonant capacitor of the resonant converter. Moreover, a filtering capacitor C0 and a load resistor R0 are configured at the other side of the resonant converter. According to FIG. 4, the integrated transformer 1 and the mentioned circuit elements form a power stage circuit of the resonant converter.

Figure 5A:
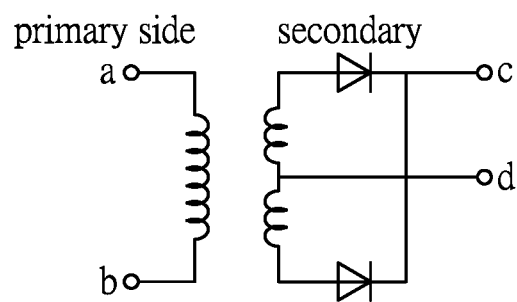
FIG. 5A and FIG. 5B show schematic diagrams of the integrated transformer shown in FIG. 4.
Figure 5B:
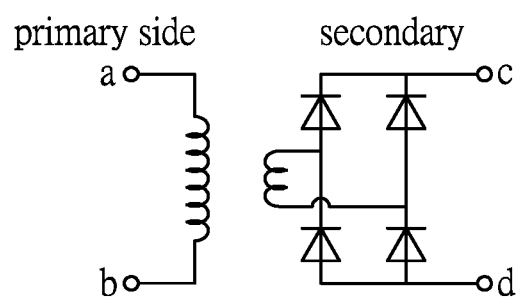

FIG. 5A and FIG. 5B show schematic diagrams of the integrated transformer shown in FIG. 4. For example, the integrated transformer 1 can be a center-tapped filtering type of integrated transformer. As shown in FIG. 4 and FIG. 5A, the node a and the node b of the primary side circuit of the integrated transformer in FIG. 5A are coupled respectively to the capacitor Cr and the input voltage Vin of the resonant converter. In addition, the node c and the node d of the secondary side circuit of the integrated transformer in FIG. 5A are coupled respectively to two ends of the filtering capacitor C0. For another example, the integrated transformer 1 can be a full-bridge filtering type of integrated transformer. As shown in FIG. 4 and FIG. 5B, the node a and the node b of the primary side circuit of the integrated transformer in FIG. 5B are coupled respectively to the capacitor Cr and the input voltage Vin of the resonant converter. In addition, the node c and the node d of the secondary side circuit of the integrated transformer in FIG. 5B are coupled respectively to two ends of the filtering capacitor C0.

[Another Embodiment of the Integrated Transformer]

The integrated transformer in this embodiment can also be used in a resonant converter. The integrated transformer in this embodiment has an integrated core having a specific structure similar to the structure of the integrated core of the integrated transformer in the above embodiment. However, the difference between the integrated transformer in this embodiment and the integrated transformer in the last embodiment is that, in this embodiment, the coil of the primary side circuit is configured at the center column of the integrated core instead of the rim columns of the integrated core. Additionally, the coils of the secondary side circuit are not configured outside the integrated core but are configured respectively at the rim columns of the integrated core.

Usually, when the input voltage of the resonant converter changes from a high voltage to a low voltage, the circuit elements of the secondary side circuit of the integrated transformer may damage because the current flowing through the secondary side circuit is too large. However, in this embodiment, the coil of the primary side circuit is configured at the center column of the integrated core, and the coils of the secondary side circuit are configured respectively at the rim columns of the integrated core, so the current flowing through the secondary side circuit can be discharged by many current paths provided by the integrated core. Moreover, in this embodiment, the turn numbers of coils of the secondary side circuit are designed to be equal or unequal, such that the same second voltage or different second voltages can be obtained by the integrated transformer.

It should be noted that, in this embodiment, the coils of the primary side circuit and the secondary side circuit are implemented by wirings configured on a plurality of PCBs. In other words, the integrated transformer provided by this embodiment is not designed according to a conventional wound primary type transformer bur according to a planar transformer.

To sum up, the integrated core of the integrated transformer provided by the present disclosure has a specific structure described above, so without having air gaps, changing turn numbers of coils or using different types of core, the magnetizing inductance inside the integrated transformer can still be reduced such that the integrated transformer can be used in a resonant converter.

Moreover, the integrated core of the integrated transformer provided by the present disclosure has a specific structure so it can provide many current paths to discharge the current flowing through the secondary side circuit, such that the circuit elements of the secondary side circuit of the integrated transformer will not damage even when the current flowing through the secondary side circuit is large.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An integrated transformer, used in a resonant converter, comprising:
   a primary side circuit and a secondary side circuit, both including a plurality of coils, wherein a first voltage received by the primary side circuit is converted to a second voltage due to the electromagnetic induction, and the second voltage is outputted by the secondary side circuit; and
   an integrated core, wherein the primary side circuit is configured on the integrated core;
   wherein the integrated core includes a plurality of iron rings, the iron rings have a common side, the common side of the iron rings is a center column of the integrated core, the other sides of the iron rings are rim columns of the integrated core, the coils of the primary side circuit are configured respectively to the rim columns of the integrated core, and the coils of the primary side circuit are connected in serial;
   wherein after the primary side circuit receives the first voltage, the magnetic flux generated by one of the coils of the primary side circuit is split to the center column of the integrated core and to the other coils of the primary side circuit;
   wherein the magnetic flux generated by each coil of the primary side circuit respectively flows through a corresponding rim column according to a first direction, the magnetic flux generated by each coil of the primary side circuit flows through the center column and the other rim columns according to a second direction, and the second direction is opposite to the first direction; and
   wherein the corresponding rim column is the rim column each coil is wrapped around.

2. The integrated transformer according to claim 1, wherein the secondary side circuit is configured outside the integrated core, and the coils of the secondary side circuit are connected in parallel.

3. The integrated transformer according to claim 1, wherein the coils of the primary side circuit are wrapped respectively around the rim columns of the integrated core according to the same direction.

4. The integrated transformer according to claim 1, wherein the magnetic flux generated by each coil of the primary side circuit is partially cancelled by the magnetic fluxes generated by the other coils of the primary side circuit.

5. The integrated transformer according to claim 1, wherein the coils of the primary side circuit and the secondary side circuit are implemented by wirings configured on a plurality of printed circuit boards (PCBs).

6. An integrated transformer, used in a resonant converter, comprising:
   a primary side circuit and a secondary side circuit, wherein the primary side circuit includes a coil, the secondary side circuit includes a plurality of coils, a first voltage received by the primary side circuit is converted to a second voltage due to the electromagnetic induction, and the second voltage is outputted by the secondary side circuit; and
   an integrated core, wherein the primary side circuit and the secondary side circuit are configured on the integrated core;
   wherein the integrated core includes a plurality of iron rings, the iron rings have a common side, the common side of iron rings is a center column of the integrated core, the other sides of the iron rings are rim columns of the integrated core, the coil of the primary side circuit is configured on the center column of the integrated core, and the coils of the secondary side circuit are configured respectively to the rim columns of the integrated core.

7. The integrated transformer according to claim 6, wherein the turn numbers of the coils of the secondary side circuit are equal or unequal for converting the first voltage to the same second voltage or different second voltages.

8. The integrated transformer according to claim 6, wherein the coils of the primary side circuit and the secondary side circuit are implemented by wirings configured on a plurality of printed circuit boards (PCBs).

* * * * *